(12) United States Patent
Sartler et al.

(10) Patent No.: US 11,139,746 B2
(45) Date of Patent: Oct. 5, 2021

(54) POWER CONVERTER WITH REDUCED SWITCH MODE POWER SUPPLY EMI

(71) Applicant: Rockwell Automation Technologies, Inc., Mayfield Heights, OH (US)

(72) Inventors: Christian S. Sartler, Milwaukee, WI (US); Puneeth Kumar Srikanta Murthy, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/773,093

(22) Filed: Jan. 27, 2020

(65) Prior Publication Data

US 2020/0251984 A1 Aug. 6, 2020

Related U.S. Application Data

(60) Provisional application No. 62/799,545, filed on Jan. 31, 2019.

(51) Int. Cl.
*H02M 5/458* (2006.01)
*H02M 3/335* (2006.01)
(Continued)

(52) U.S. Cl.
CPC ......... *H02M 5/4585* (2013.01); *H02M 1/088* (2013.01); *H02M 1/44* (2013.01);
(Continued)

(58) Field of Classification Search
CPC ...... H02M 1/088; H02M 1/44; H02M 5/4585; H02M 2001/0006; H02P 27/08
See application file for complete search history.

(56) References Cited

U.S. PATENT DOCUMENTS

| 3,387,229 A | * | 6/1968 | Corey | H03K 3/30 |
| | | | | 331/113 A |
| 3,859,590 A | * | 1/1975 | Cielo | H02M 3/33546 |
| | | | | 323/290 |

(Continued)

FOREIGN PATENT DOCUMENTS

| EP | 0573836 | 12/1993 |
| FR | 1582031 | 9/1969 |

(Continued)

OTHER PUBLICATIONS

Dusan M. Raonic, "SCR Self-Supplied Gate Driver for Medium-Voltage Application with Capacitor as Storage Element", IEEE Transaction on Industry Applications, vol. 36, No. 1, Jan./Feb. 2000.

(Continued)

*Primary Examiner* — Yusef A Ahmed
(74) *Attorney, Agent, or Firm* — Fay Sharpe LLP

(57) ABSTRACT

A power conversion system includes a converter circuit having switching devices, driver circuits to operate the switching devices according to switching control signal, and power supplies to power the driver circuits. The individual power supplies include a transformer with a primary winding and a secondary winding, a reference node coupled to a first terminal of the secondary winding, a power supply output node coupled to a supply input of an associated one of the driver circuits, a rectifier, including a first terminal coupled to a second terminal of the secondary winding, and a second terminal coupled to the power supply output node, and a clamp circuit, including a first terminal coupled to the first terminal of the rectifier, and a second terminal coupled to the reference node.

18 Claims, 7 Drawing Sheets

(51) Int. Cl.
  *H02M 1/44* (2007.01)
  *H02M 1/088* (2006.01)
  *H02P 27/08* (2006.01)
  *H02M 1/00* (2006.01)
(52) U.S. Cl.
  CPC .......... *H02M 1/0006* (2021.05); *H02M 3/335* (2013.01); *H02P 27/08* (2013.01)

(56) References Cited

U.S. PATENT DOCUMENTS

| | | | |
|---|---|---|---|
| 4,253,136 A * | 2/1981 | Nanko | H02M 3/33546 363/21.02 |
| 4,542,440 A * | 9/1985 | Chetty | H02M 3/3378 361/100 |
| 4,804,900 A | 2/1989 | Soeda | |
| 5,424,937 A | 6/1995 | Iyotani et al. | |
| 5,483,192 A * | 1/1996 | Tai | H02M 1/08 327/440 |
| 5,796,599 A * | 8/1998 | Raonic | H03K 17/08144 363/57 |
| 5,943,224 A * | 8/1999 | Mao | H02M 3/155 363/52 |
| 5,982,646 A | 11/1999 | Lyons et al. | |
| 6,016,095 A * | 1/2000 | Herbert | H01F 17/06 323/361 |
| 6,049,471 A * | 4/2000 | Korcharz | H02M 3/33515 363/20 |
| 6,064,580 A * | 5/2000 | Watanabe | H02M 3/33592 363/17 |
| 6,351,359 B1 | 2/2002 | Jæger | |
| 6,351,397 B1 | 2/2002 | Sawa et al. | |
| 6,366,483 B1 | 4/2002 | Ma et al. | |
| 6,396,672 B1 | 5/2002 | Deam | |
| 6,417,719 B1 | 7/2002 | Deam | |
| 6,493,242 B1 | 12/2002 | Riggio et al. | |
| 6,496,391 B1 * | 12/2002 | Ikeda | H02M 3/156 363/53 |
| 6,565,119 B2 | 5/2003 | Fogle, Jr. | |
| 6,710,994 B1 | 3/2004 | Deam | |
| 6,970,367 B2 | 11/2005 | Takeshima et al. | |
| 7,295,448 B2 | 11/2007 | Zhu | |
| 7,511,976 B2 | 3/2009 | Zargari et al. | |
| 7,576,451 B2 * | 8/2009 | Maclennan | H03K 17/0403 307/412 |
| 7,791,884 B2 | 9/2010 | Huang et al. | |
| 7,965,526 B2 | 6/2011 | Zargari et al. | |
| 8,476,859 B2 | 7/2013 | Bortolus et al. | |
| 9,960,706 B1 * | 5/2018 | Chiu | H02M 7/217 |
| 10,135,360 B2 * | 11/2018 | Goto | H02M 7/5387 |
| 10,289,182 B2 * | 5/2019 | Bezawada | H04W 88/08 |
| 10,362,644 B1 * | 7/2019 | Xiong | H02M 3/33576 |
| 10,476,381 B1 * | 11/2019 | Sartler | H02M 1/126 |
| 2003/0103360 A1 | 6/2003 | Hatta et al. | |
| 2004/0240239 A1 * | 12/2004 | Ying | H02M 3/155 363/52 |
| 2004/0264218 A1 | 12/2004 | Ohishi et al. | |
| 2005/0024898 A1 * | 2/2005 | Yang | H02M 3/33507 363/21.12 |
| 2005/0152162 A1 * | 7/2005 | Lynch | H02M 1/08 363/24 |
| 2005/0226012 A1 * | 10/2005 | Jovanovic | H02M 3/335 363/59 |
| 2005/0259451 A1 | 11/2005 | Mbaye | |
| 2006/0209570 A1 * | 9/2006 | Park | H02M 3/33507 363/16 |
| 2007/0152648 A1 | 7/2007 | Gabello et al. | |
| 2007/0297202 A1 * | 12/2007 | Zargari | H02M 1/32 363/50 |
| 2008/0231211 A1 | 9/2008 | Baarman et al. | |
| 2008/0259649 A1 * | 10/2008 | Marchand | H02M 3/3378 363/21.03 |
| 2008/0298094 A1 * | 12/2008 | Cuadra | H02M 3/33561 363/21.12 |
| 2009/0290391 A1 * | 11/2009 | Toccaceli | H02M 3/33592 363/21.14 |
| 2010/0201197 A1 | 8/2010 | Shires et al. | |
| 2010/0309701 A1 * | 12/2010 | Wu | H02M 3/33592 363/127 |
| 2011/0058400 A1 * | 3/2011 | Fukuta | H02M 7/5387 363/131 |
| 2012/0081058 A1 * | 4/2012 | Bortolus | H02P 27/08 318/490 |
| 2015/0092466 A1 * | 4/2015 | Earanky | F24F 11/30 363/126 |
| 2015/0318791 A1 * | 11/2015 | Baumann | H02M 5/458 318/504 |
| 2016/0254662 A1 * | 9/2016 | Dawley | H02H 9/02 361/93.1 |
| 2016/0308454 A1 * | 10/2016 | Kawai | H02M 5/458 |
| 2017/0207715 A1 * | 7/2017 | Lin | H02M 3/33592 |
| 2018/0102709 A1 * | 4/2018 | Hari | H02J 7/00 |
| 2018/0138849 A1 * | 5/2018 | Royak | H02P 23/14 |
| 2018/0145602 A1 * | 5/2018 | Wei | H02M 5/458 |
| 2021/0088561 A1 * | 3/2021 | Mobley | G01R 15/183 |

FOREIGN PATENT DOCUMENTS

| | | |
|---|---|---|
| JP | 56 68432 | 12/1981 |
| JP | 59086475 | 5/1984 |

OTHER PUBLICATIONS

Dusan M. Raonic, "SCR Self Supplied Gate Driver for Medium Voltage Application with Capacitor as Storage Element", IEEE Industry Applications Conference, Thirty-Third IAS Annual Meeting, Oct. 1998.

Dusan Raonic, Dave Maclennan, Didier Rouaud, "Some Experience with SCR's Self Powered Gate Driver System for Medium Voltage Solid State Starter", IEEE Canadian Conference on Electrical and Computer Engineering Conference (CCECE), Sr. John's, Newfoundland, Canada, May 25-28, 1997.

Power Integrations, "TOP242-250 TOPswitch-GX Family Application Notes", Nov. 2005.

B. Odegard, R. Ernst, "Applying IGCT Gate Units", ABB Application Note 5SYA 2031, Dec. 2002.

ABB Switzerland LTD, Semiconductors, "Current Source Power Supply", Jan. 2010.

"High Power Semiconductors Short Form Catalogue 2010", ABB Switzerland LTD.

"LM5160, LM5160A Wide Input 65-V, 2-A Synchronous Buck / Fly-Buck™ DC/DC Converter" Texas Instruments, LM5160, LM5160A, SNVSA03E—Oct. 2014—Revised Oct. 2018, 38 pages.

Littelfuse®, "Transient Voltage Suppression Diodes Surface Mount—400W > SMAJ series", © 2015 Littelfuse, Inc., Revised Nov. 20, 2015, 5 pages.

Wurth Elecktronik, "WE-CBF SMT EMI Suppression Ferrite Bead," 74279206 datasheet, Aug. 28, 2019. [Online]. Available: mouser.com/datasheet/2/445/74279206-538333.pdf. [Accessed Jan. 22, 2020].

* cited by examiner

POWER CONVERTER WITH REDUCED SWITCH MODE POWER SUPPLY EMI

CROSS-REFERENCE TO RELATED APPLICATIONS

Under 35 U.S.C. § 119, this application claims priority to, and the benefit of, U.S. provisional application No. 62/799,545, entitled "INDUSTRIAL AUTOMATION MULTI DRIVE", and filed on Jan. 31, 2019, the entirety of which is hereby incorporated by reference.

BACKGROUND

This disclosure relates to power conversion systems and reducing electromagnetic interference (EMI) in switch mode power supplies thereof.

SUMMARY

In accordance with one aspect, a power conversion system includes a converter circuit having switching devices, driver circuits to operate the switching devices according to switching control signal, and power supplies to power the driver circuits. The individual power supplies include a transformer with a primary winding and a secondary winding, a reference node coupled to a first terminal of the secondary winding, a power supply output node coupled to a supply input of an associated one of the driver circuits, a rectifier, including a first terminal coupled to a second terminal of the secondary winding, and a second terminal coupled to the power supply output node, and a clamp circuit, including a first terminal coupled to the first terminal of the rectifier, and a second terminal coupled to the reference node.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

DETAILED DESCRIPTION

Figure 1:
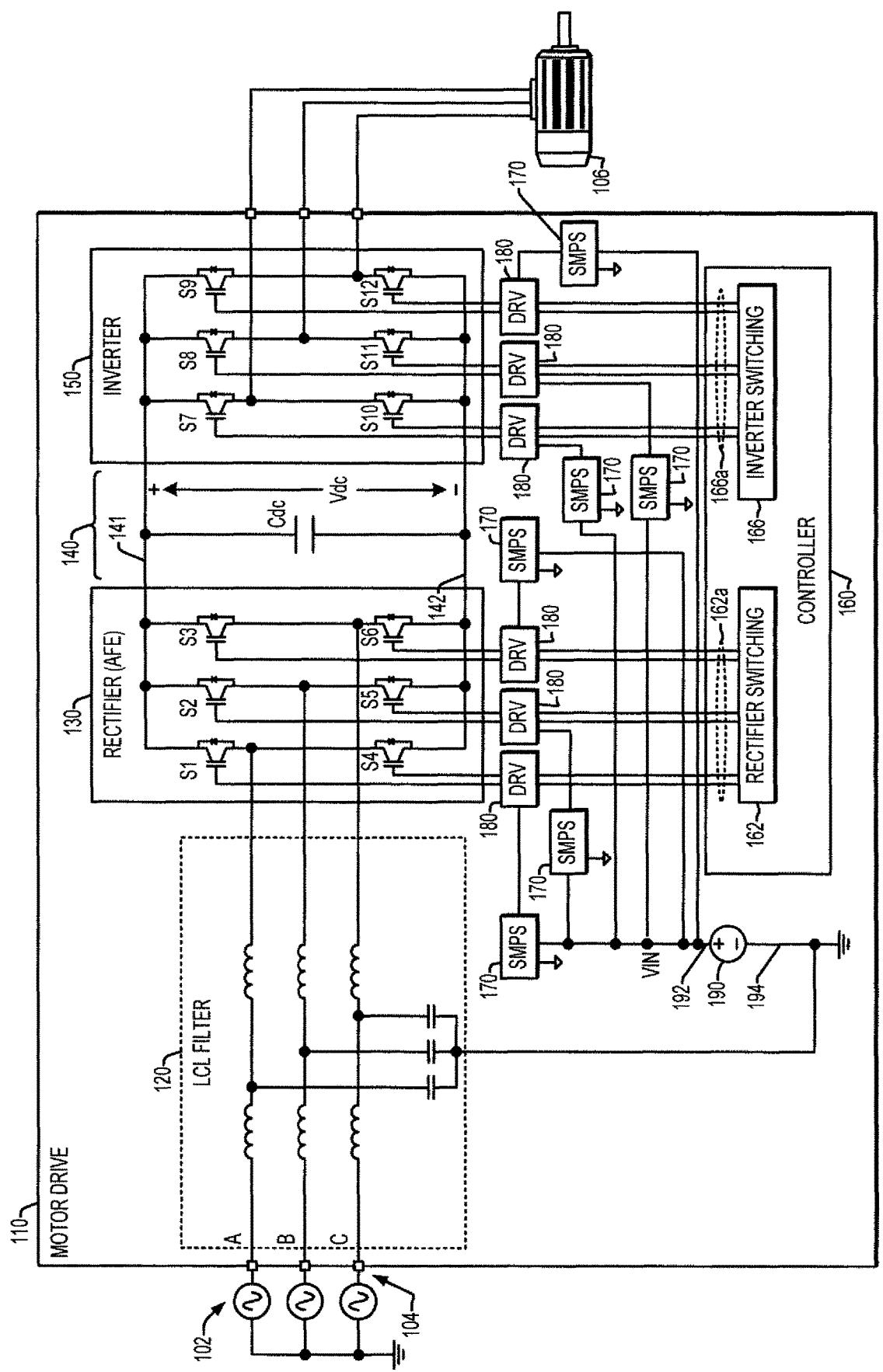
FIG. 1 is a schematic diagram of a power conversion system with switch mode power supplies to supply switch driver circuits.

Referring now to the figures, several embodiments or implementations are hereinafter described in conjunction with the drawings, wherein like reference numerals are used to refer to like elements throughout, and wherein the various features are not necessarily drawn to scale. The term "couple" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections. One or more operational characteristics of various circuits, systems and/or components are described in the context of functions which in some cases result from configuration and/or interconnection of various structures when circuitry is powered and operating.

Disclosed examples provide motor drives or other power conversion systems for driving a motor or other load, as well as switch mode power supplies thereof for powering converter switch drivers. Switch mode power supplies (SMPSs) can be used to power driver circuits for driving (e.g., actuating) switches of an active front end (AFE) and/or for to power drivers for inverter switches of an output inverter. Switch mode power supplies in motor drives can emit electromagnetic interference both radiated and conducted. One source of interference can be resonant action of an LC circuit formed by the power supply secondary circuit, for example, in a resonant or flyback converter with an isolation transformer. Switching a transistor on can cause a damped sinusoid to form with peak voltages that can be many times the input voltage. An RC or RC-diode (RCD) snubber connected across the transistor can dampen ringing or oscillations. However, snubber circuits remain in the circuit all the time in the case of an RC snubber or effectively half the time for an RCD snubber, causing reduced efficiency and heat dissipation.

Figure 2:
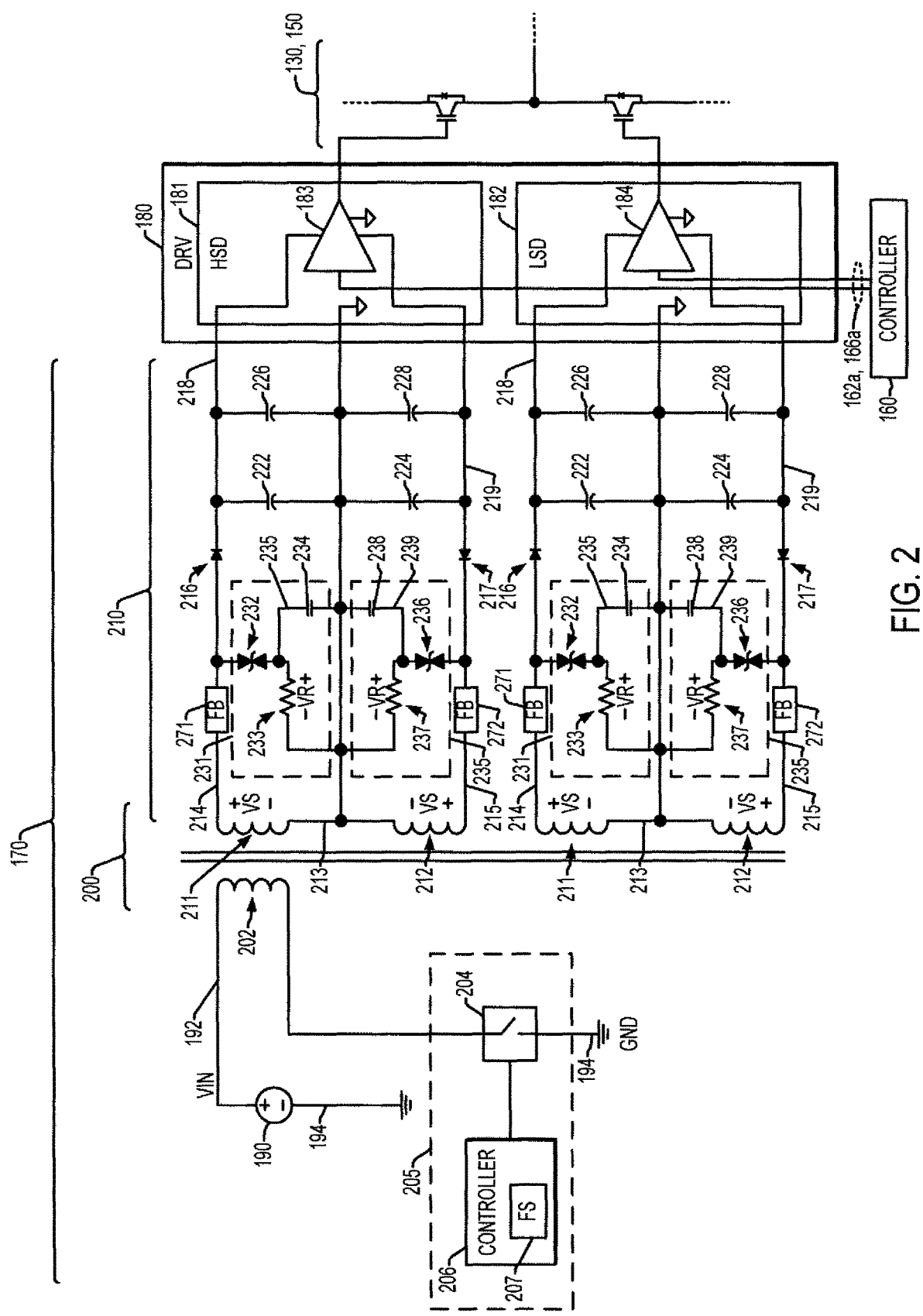
FIG. 2 is a schematic diagram showing further details of an example switch mode power supply with secondary side clamp circuits to control EMI.

The system of FIG. 1 includes example clamp circuitry in the SMPS driver supplies that dampens high order frequencies and clamps only the voltage above the steady state value. This reduces component size, cost, power dissipation, and mitigates or avoids expensive and bulky common mode cores, while yielding improved EMI performance with significantly lower radiated and conducted emissions. The clamp circuit aspects of the disclosed examples can be used for either or both active rectifier switch driver supplies, and inverter switch driver supplies for motor drive and other power conversion system applications. The example clamp circuits can be used alone or in combination with ferrite beads, and present improvements in EMI reduction beyond that achieved with ferrite beads in series with the transformer secondary and/or choosing output rectifier diodes with soft turn off time. Example implementations use clamp circuits connected before the output rectifier, with a resistor, capacitor and a bipolar transient voltage suppressor (TVS) or other TVS components which can be supplemented by ferrite beads FIG. 1 shows a motor drive power conversion system with switch mode power supplies to supply switch driver circuits, and FIG. 2 shows further details of an example switch mode power supply with secondary side clamp circuits to control EMI. The system includes a motor drive 110 that receives three-phase electrical input power from a power source 102 via input terminals 104 connected to an LCL input filter 120. The drive 110 includes an AFE rectifier 130 with switching devices S1-S6 operated according to switching control signals 162a from a rectifier switching control component 162 of a motor drive controller 160. The switching operation of the rectifier 130 converts AC input power from phases A, B and C to provide DC power via a DC bus voltage signal Vdc at respective first and second DC nodes 141 and 142 across a DC bus capacitor Cdc of an intermediate DC bus circuit 140. The DC bus voltage Vdc is provided as an input to a voltage source inverter 150 (VSI) that includes switching devices S7-S12 operated according to inverter switching control signals 166a from an inverter switching component 166 of the controller 160. The switching operation of the inverter 150 converters the DC power of the bus circuit 140 to AC output power provided as variable frequency, variable amplitude AC output signals at phase lines to drive a motor load 106.

The motor drive 110 in one example includes an output voltage feedback system to provide feedback signals or values to one or more processors of the controller 160 for controlling the operation of the AFE rectifier 130 and the output inverter 150. The controller 160 is implemented using analog circuitry as well as one or more processors and associated memory provided with programming instructions to implement the rectifier and inverter switching control functions according to known pulse width modulation switching control principles, according to feedback signals or values from sensors in the motor drive 110 (not shown). The controller 160 uses the feedback signals or values, including those representing the output voltages for various motor control functions to generate pulse width modulated (PWM) switching control signals 162a and 166a in operating the respective active front and rectifier 130 and/or the inverter 150 for converting AC input power to DC bus power and converting the DC power to output AC power to drive the motor load 106 according to a desired speed, torque and/or other setpoint values and/or for operating the drive 110. In operation, the respective rectifier and inverter converters 130 and 150 convert AC power to DC power or DC power to AC power. The respective sets of switching devices S1-S6 and S7-S12 selectively couple one of the respective AC nodes with a respective one of the first and second DC nodes 141 and 142 according to a respective switching control signal 162a and 166a generated by the switching controller components 162 and 166.

The power conversion system 110 also includes switch mode power supplies 170 and driver circuits 180 coupled to the respective switch circuits of the rectifier 130 and the inverter 150 to deliver driver signals (e.g., gate control signals) to control terminals of the switching devices S1-S6 and S7-S12 according to the switching control signal 162a and 166a, respectively. The system 110 also includes a voltage supply 190 with a positive output 192 that provides an input voltage signal VIN as an input to the switch mode power supplies 170, and a ground or reference terminal coupled to a reference voltage node 194, such as a neutral node of an LCLO input filter 120. The power supplies 170 are individually coupled to a respective one or group of the driver circuits 180. In the example of FIGS. 1 and 2, the individual driver circuits 180 receive one or two switching control signals from the controller 160 and provide two, generally complementary, driver signals to operate high and low side switches associated with a given phase of the corresponding AC nodes. For example, a first driver circuit 180 associated with the rectifier 130 in FIG. 1 receives one or two rectifier switching control signals 162a from the rectifier control component 162, and provides a high side driver signal to operate the switch S1 connected between the AC phase A and the first DC node 141, as well as a complementary low side driver signal to the corresponding low side rectifier switching device S4 connected between the phase A and the second DC node 142. The example driver circuits 180 associated with the inverter 150 are similarly configured in the illustrated example, with a driver circuit 180 and associated SMPS 170 for each pair of high and low side inverter switches.

As best shown in FIG. 2, the driver circuits 180 in one example include a first or high side driver circuit 181 (labeled HSD) and a second or low side driver circuit 182 (LSD). The high side circuit 181 includes a driver 183 with an input coupled to receive a high side switching control signal from the controller 160, a first supply input coupled to receive a positive supply voltage from a first power supply output node 218 of the power supply 170, and a second supply input coupled to receive a negative supply voltage from a second power supply output node 219 of the power supply 170. The example driver 183 has bipolar voltage rails referenced to the reference node 213. Single ended drivers can be used in other implementations. The low side circuit 181 includes a driver 184 with an input coupled to receive a low side switching control signal from the controller 160, a first supply input coupled to receive a positive supply voltage from a first power supply output node 218 of another secondary circuit of the power supply 170, and a second supply input coupled to receive a negative supply voltage from a second power supply output node 219 of the other secondary circuit of the power supply 170. The drivers 183 and 184 have respective outputs coupled to gate control terminals of associated high and low side switches of the associated converter 130 or 150.

In this example, the individual power supplies 170 include a transformer 200 having a primary winding 202 coupled to the output 192 to receive the input voltage VIN from the voltage supply 190. The output 192 of the voltage supply 190 is coupled to an upper first terminal of the primary winding 202. The lower second terminal of the primary winding 200 is coupled to a switch 204. The switch 204 is coupled between the primary winding 202 and the reference node 194 and operates according to a control signal from a controller 206 to selectively couples the lower terminal of the primary winding 202 to the reference voltage node 194. The controller 206 includes an output coupled to the switch 204 and is configured to operate the switch 204 at a switching frequency 207 (FS). In one example, the controller 206 and the switch 204 are included in an integrated circuit 205, such as a LM5160DNTJ fly buck converter from Texas Instruments Incorporated that operates at a switching frequency FS of 400 KHz or more and 600 KHz or less, such as about 500 KHz.

The supply 170 has a secondary circuit 210 with two isolated sections. The individual secondary sections of the transformer 200 in this example include two center-tapped secondary windings 211 and 212 with a center tap or reference node 213 coupled to a first terminal of the secondary winding 211, 212, a second terminal 214 and a third terminal 215. An upper circuit branch extends from the second terminal 214 of the secondary winding 211 through a first rectifier 216 (e.g., transformer or diode as shown) to a first power supply output node 218 coupled to a supply input of an associated one of the driver circuits 180. The first rectifier 216 includes a first terminal (e.g., anode) coupled to the second terminal 214 of the secondary winding 211, 212, and a second terminal (e.g., cathode) coupled to the first power supply output node 218. A lower circuit branch extends from the third terminal 215 of the secondary winding 212 through a second rectifier 217 (e.g., transformer or diode as shown) to the second power supply output node 219 coupled to the second supply input of the associated driver circuit 180. The second rectifier 217 includes a first terminal (e.g., cathode) coupled to the third terminal 215 of the secondary winding 211, 212, and a second terminal (e.g., anode) coupled to the second power supply output node 219.

The individual sections of the secondary circuit 210 include a first capacitor 222 (e.g., 10 µF, 25 V) coupled between the first power supply output node 218 and the reference node 213, as well as a second capacitor 224 (e.g., 10 µF, 25 V) coupled between the reference node 213 and the second power supply output node 219. In one example, the individual sections of the secondary circuit 210 also include a third capacitor 226 (e.g., 0.1 µF, 25 V) coupled between the first power supply output node 218 and the reference node 213, and a fourth capacitor 228 (e.g., 0.1 µF, 25 V) coupled between the reference node 213 and the second power supply output node 219. In the illustrated example, the transformer 200 has a pair of bi-polar outputs and the individual sections of the secondary circuit 120 provide a positive first output voltage at the first output 218 of about +17 VDC and a negative second output voltage at the output 219 of about −8 VDC. Single ended supplies can be generated in other examples to power single ended drivers.

Each section of the secondary circuit 210 includes first and second clamp circuits. A first clamp circuit 231 includes a first terminal directly coupled to the first terminal of the first rectifier 216, and a second terminal directly coupled to the reference node 213. The first clamp circuit 231 in FIG. 2 includes a transient voltage suppressor (TVS) 232. The TVS 232 includes a first terminal directly coupled to the first terminal of the first rectifier 216, and a second terminal directly coupled to a first internal node 235. The first clamp circuit 231 also includes a resistor 233 (e.g., 10 OHMS) with a resistor voltage VR. The resistor 233 includes a first terminal directly coupled to the first internal node 235 and a second terminal directly coupled to the reference node 213, as well as a capacitor 234 (e.g., 470 pF) having a first terminal directly coupled to the first internal node 235 and a second terminal directly coupled to the reference node 213.

A second clamp circuit 235 includes a first terminal directly coupled to the first terminal of the second rectifier 217, and a second terminal directly coupled to the reference node 213 to limit a second secondary voltage VS across the secondary winding 212. The second clamp circuit 235 in one example includes a second transient TVS 236 with a first terminal directly coupled to the first terminal of the second rectifier 217, and a second terminal directly coupled to a second internal node 239. In addition, the second clamp circuit 235 includes a second resistor 237 (e.g., 10 OHMS) with a resistor voltage VR. The resistor 237 includes a first terminal directly coupled to the second internal node 239, and a second terminal directly coupled to the reference node 213, as well as a second capacitor 238 (e.g., 470 pF), including a first terminal directly coupled to the second internal node 239, and a second terminal directly coupled to the reference node 213.

In one example, the first and second TVSs 232 and 236 are bidirectional transient voltage suppression diodes, such as an SMAJ series surface mount 400 W bidirectional transient voltage suppression diode from Littlefuse, Inc. Other types of TVS can be used, including without limitation a bidirectional transient voltage suppressor diode, a metal oxide varistor (MOV), and an avalanche diode. In operation, the first clamp circuit 231 limits a secondary voltage VS across the secondary winding 211. The first clamp circuit 231 in this example operates to suppress high frequency components of the secondary voltage VS above the switching frequency 207 and does not suppress components of the secondary voltage VS at or below the switching frequency 207. In one example, the output of the controller 206 is configured to operate the switch 204 at a switching frequency 207 of 400 KHz or more and 600 KHz or less, and the first clamp circuit 231 is configured to suppress high frequency components of the secondary voltage VS at 20 MHz or more and 100 MHz or less. In other examples, the first clamp circuit 231 is configured to suppress high frequency components of the secondary voltage VS at 1 MHz or more and 100 MHz or less. Other forms of clamp circuits can be used. The second clamp circuit 235 operates in similar fashion as the first clamp circuit 231.

In one example, the secondary circuit 210 also includes a ferrite bead 271 with a first terminal directly coupled to the second terminal 214 of the secondary winding 211, 212, and a second terminal directly coupled to the first terminal of the rectifier 216. In one example, the secondary circuit 210 also includes another ferrite bead 272, having a first terminal directly coupled to the third terminal 215 of the secondary winding 212, and a second terminal directly coupled to the first terminal of the second rectifier 217. The ferrite beads in one example can be a WE-CBF surface mount (SMT) EMI suppression bead from Wurth Elektronik with a rated impedance of 30 OHMs at 100 MHz and a rated DC resistance of 0.025 OHMs.

Referring also to FIGS. 3-6, the clamp circuits 231 and 235 in FIG. 2, whether alone or in combination with the ferrite beads 271 and 272, facilitate reduced EMI reduction in operation of the power supplies 170 to power the driver circuits 180 during operation of the power conversion system. For example, the reduced EMI facilitates satisfying motor drive system EMI requirements, such as IEC61800-3 and CISPR 16 by reducing the magnitude of the EMI rather than trying to contain the EMI/prevent it from radiating. The disclosed clamp circuits 231 and 235 reduce the source of EMI to an intrinsically smaller signature rather than using expensive common mode cores and/or shields to cover up the EMI. The disclosed clamp circuits 231 and 235, moreover, can be used in other power conversion system applications with any form of switch mode power supply, including without limitation fly-buck converters, resonant converters, buck converters, boost converters, buck-boost converters, cuk converters, etc.

Figure 3:
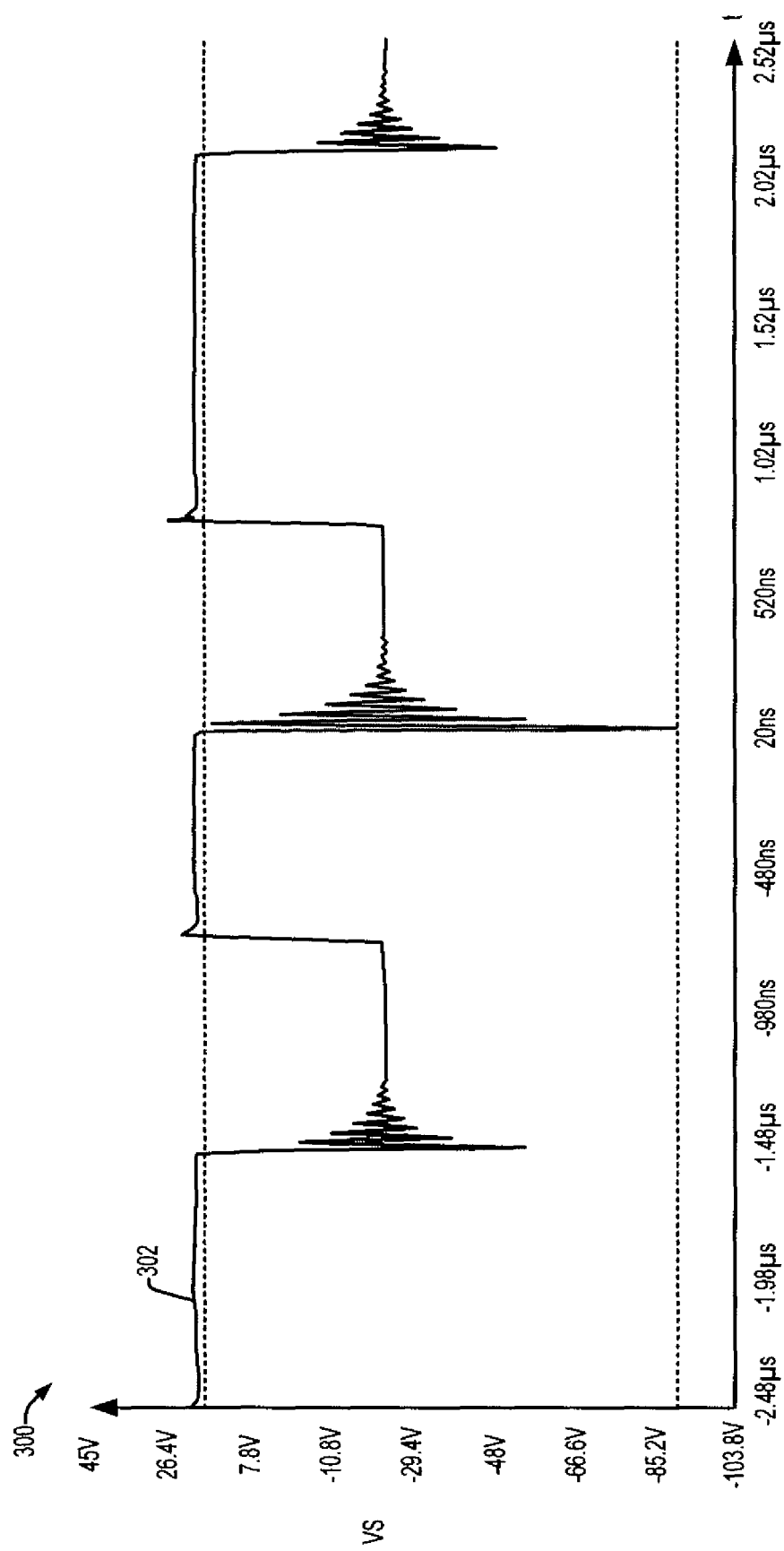
FIG. 3 is a waveform diagram of transformer secondary voltage as a function of time for a switch mode power supply with no secondary side clamp circuits and no secondary side ferrite beads.

FIG. 3 shows a graph 300 of transformer secondary voltage VS as a function of time for a switch mode power supply with no secondary side clamp circuits and no secondary side ferrite beads, for the SMPS with a switching frequency FS of 500 KHz. The graph 300 includes a curve 302 that shows the voltage VS across the secondary side of the isolation transformer (e.g., the voltage across the secondary winding 211 in FIG. 2. The peak negative voltage reaches −90.4 V while the drive is not modulating. In this example, when the drive starts modulating and the power supply is loaded the peak voltages reach −110.5 V. In further tests, the secondary voltage VS reached peaks up to −103V and an oscillation time of over 400 µs with a fundamental of 29 MHz with the addition of other frequencies.

Figure 4:
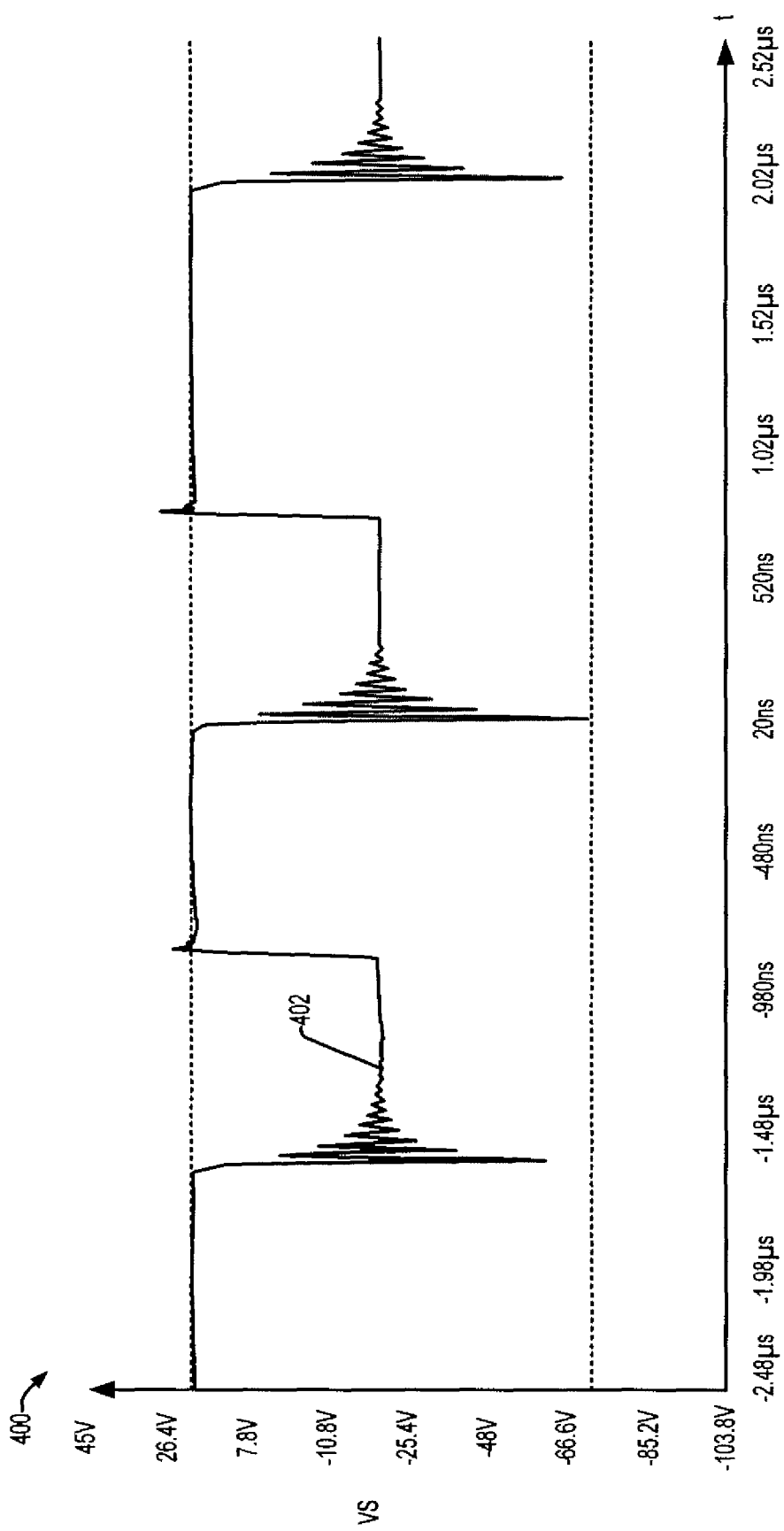
FIG. 4 is a waveform diagram of transformer secondary voltage as a function of time for a switch mode power supply with no secondary side clamp circuits and included secondary side ferrite beads.

FIG. 4 shows a graph 400 with a curve 402 of transformer secondary voltage VS as a function of time for a switch mode power supply with no secondary side clamp circuits and included secondary side ferrite beads between the rectifying diode and the transformer secondary. The peak voltages are significantly lower but still reach −72.4 V while the drive is not modulating. When the drive starts modulating and the power supply is loaded the peak voltages reach −78.5 V.

Figure 5:
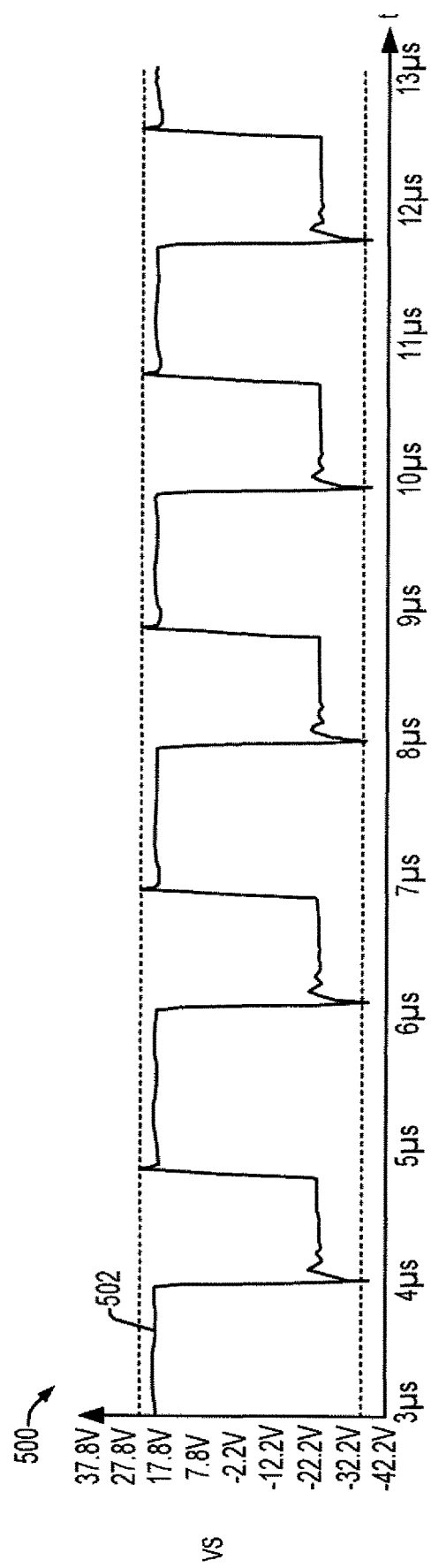
FIG. 5 is a waveform diagram of transformer secondary voltage as a function of time for a switch mode power supply with secondary side clamp circuits and ferrite beads.

FIG. 5 includes a graph 500 with a curve 502 that shows the transformer secondary voltage VS as a function of time for the switch mode power supply of FIG. 2 with the secondary side clamp circuits 231 and 235 and the ferrite beads 271 and 272. In this example, clamp circuits 231 and 235 are configured to suppress high frequency components of the secondary voltage at 20 MHz or more and 100 MHz or less, and the SMPS 170 operates at a switching frequency FS of 500 KHz. The peak voltage VS in this example only reaches −35 V while the drive is not modulating. In this example, the peak voltages do not increase when the drive starts modulating and the power supply 170 is loaded.

Figure 6:
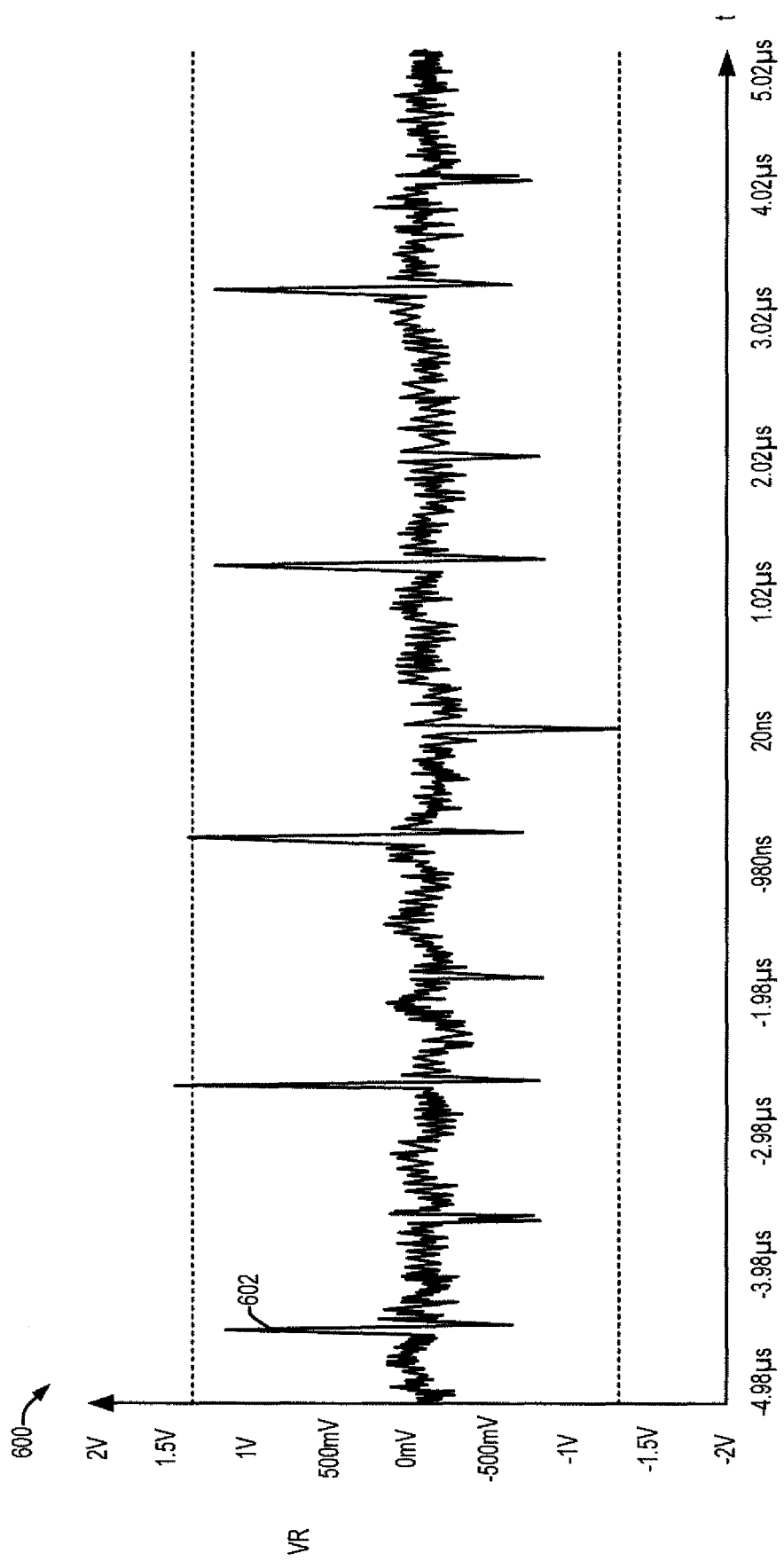
FIG. 6 is a waveform diagram of secondary side clamp circuit resistor voltage as a function of time for a switch mode power supply with secondary side clamp circuits and included secondary side ferrite beads.

FIG. 6 shows a graph 600 with a curve 602 of the secondary side clamp circuit resistor voltage (VR in FIG. 2) as a function of time for the switch mode power supply 170 with the secondary side clamp circuits 231 and 235 and the secondary side ferrite beads 271 and 272. In this example, the peak voltage VR across the resistors 233 and 237 were no greater than 1.5 V, even during loading, which corresponds to peak currents of 150 mA through the TVSs 232 and 236 and the resistors 233 and 237, and a power dissipation of 225 mW across the resistors 233 and 237, and the corresponding RMS current was dissipation was much lower.

Figure 7:
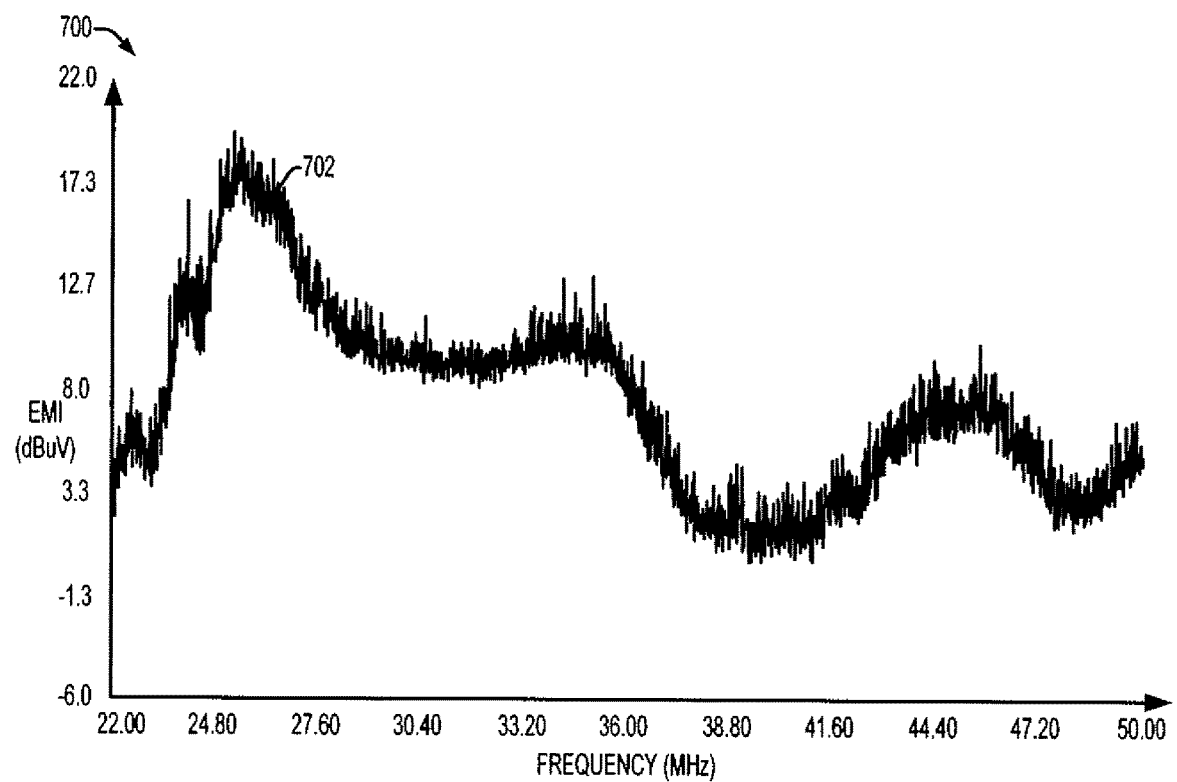
FIG. 7 is an EMI waveform diagram for a switch mode power supply with no secondary side clamp circuits.
Figure 8:
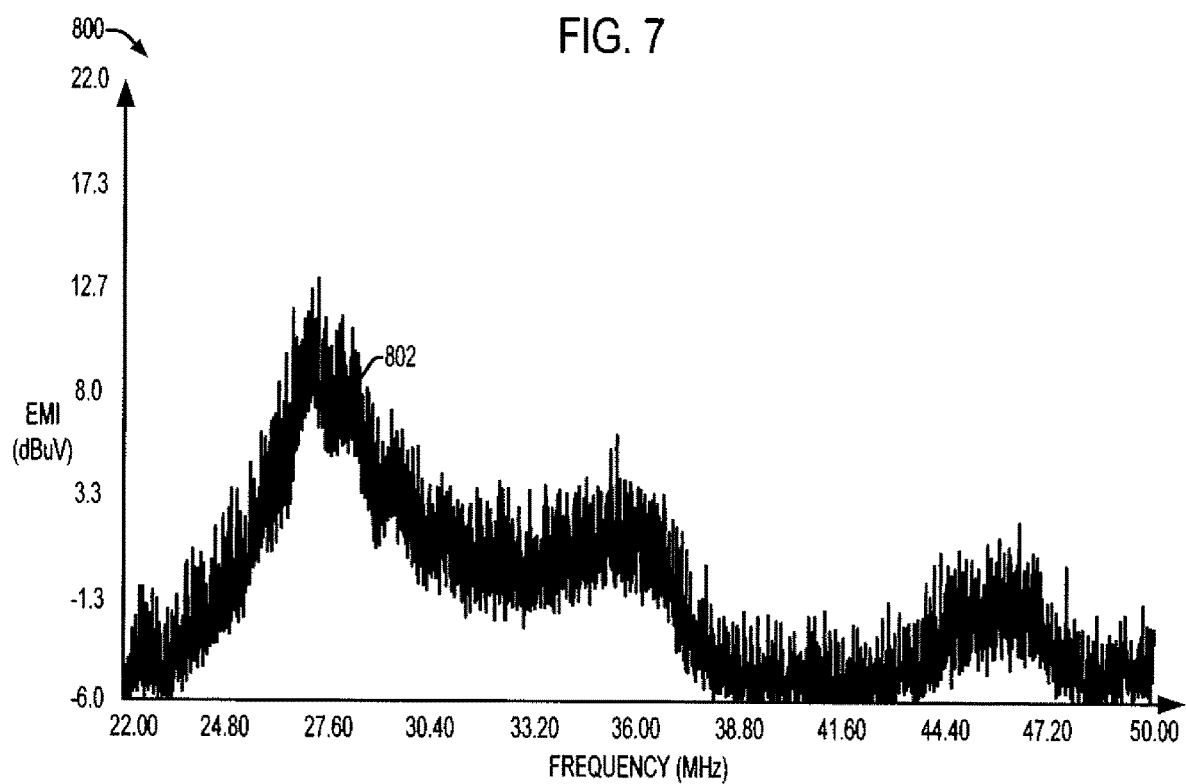
FIG. 8 is an EMI waveform diagram for a switch mode power supply with secondary side clamp circuits.

FIGS. 7 and 8 show comparative EMI performance for a switch mode power supply with no secondary side clamp circuits (FIG. 7) and for the switch mode power supply 170 of FIG. 2 with the secondary side clamp circuits 231 and 235 of FIG. 2 (FIG. 7). A graph 700 in FIG. 7 shows an EMI emissions curve 702 (dBμv) with peaks above 17.3 dBμv at about 29 MHz. The graph 800 in FIG. 8 shows an EMI curve 802 with significantly reduced amplitude and peaks of less than 13 dBμv at about 29 MHz obtained using an EM Scan nearfield scanner, showing the reduction in EMI resulting from the secondary side clamp circuits 231 and 235 of FIG. 2.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
AC nodes;
first and second DC nodes;
a converter circuit configured to convert AC power to DC power or to convert DC power to AC power, the converter circuit including switching devices respectively configured to selectively couple one of the AC nodes with a respective one of the first and second DC nodes according to a respective switching control signal;
a controller configured to generate the switching control signals;
driver circuits coupled to provide driver signals to control terminals of the switching devices according to the switching control signal; and
power supplies individually coupled to a respective one or group of the driver circuits, the individual power supplies including:
a transformer having a primary winding coupled to an input voltage, and a secondary winding;
a reference node coupled to a first terminal of the secondary winding;
a power supply output node directly connected to a supply input of an associated one of the driver circuits;
a rectifier, including a first terminal coupled to a second terminal of the secondary winding, and a second terminal coupled to the power supply output node; and
a clamp circuit, including a first terminal directly coupled to the first terminal of the rectifier, and a second terminal directly connected to the reference node to limit a secondary voltage across the secondary winding;
wherein the individual power supplies include:
a switch coupled between the primary winding and a reference voltage node; and
a second controller, including an output coupled to the switch and configured to operate the switch at a switching frequency;
wherein the clamp circuit is configured to suppress high frequency components of the secondary voltage above the switching frequency and does not suppress components of the secondary voltage at or below the switching frequency.

2. The power conversion system of claim 1, wherein:
the clamp circuit is configured to suppress high frequency components of the secondary voltage at 1 MHz or more and 100 MHz or less.

3. The power conversion system of claim 2, wherein the clamp circuit includes:
a transient voltage suppressor (TVS), including a first terminal directly coupled to the first terminal of the rectifier, and a second terminal directly coupled to a first internal node;
a resistor, including a first terminal directly coupled to the first internal node, and a second terminal directly coupled to the reference node; and
a capacitor, including a first terminal directly coupled to the first internal node, and a second terminal directly coupled to the reference node.

4. The power conversion system of claim 3, wherein the TVS is a bidirectional transient voltage suppression diode.

5. The power conversion system of claim 1, further comprising a ferrite bead, including a first terminal directly coupled to the second terminal of the secondary winding, and a second terminal directly coupled to the first terminal of the rectifier.

6. The power conversion system of claim 1, wherein the converter circuit is a rectifier circuit configured to convert AC power to DC power.

7. The power conversion system of claim 6, further comprising:
  an inverter configured to convert the DC power to AC power to drive a load, the inverter including inverter switching devices respectively configured to selectively couple one of the AC nodes with a respective one of the first and second DC nodes according to a respective inverter switching control signal from the controller;
  a second set of driver circuits coupled to provide driver signals to control terminals of the inverter switching devices according to the inverter switching control signal; and
  a second set of power supplies individually coupled to a respective one or group of the second set of driver circuits, the individual power supplies of the second set of power supplies including:
    a transformer having a primary winding coupled to an input voltage, and a secondary winding;
    a reference node coupled to a first terminal of the secondary winding;
    a power supply output node coupled to a supply input of an associated one of the driver circuits;
    a rectifier, including a first terminal coupled to a second terminal of the secondary winding, and a second terminal coupled to the power supply output node; and
    a clamp circuit, including a first terminal directly coupled to the first terminal of the rectifier, and a second terminal directly coupled to the reference node to limit a secondary voltage across the secondary winding.

8. The power conversion system of claim 1, wherein the converter circuit is an inverter configured to convert DC power to AC power to drive a load.

9. The power conversion system of claim 1, wherein the individual power supplies include:
  a second power supply output node coupled to a second supply input of the associated one of the driver circuits;
  a second rectifier, including a first terminal coupled to a third terminal of the secondary winding, and a second terminal coupled to the second power supply output node; and
  a second clamp circuit, including a first terminal directly coupled to the first terminal of the second rectifier, and a second terminal directly coupled to the reference node to limit a second secondary voltage across the secondary winding.

10. The power conversion system of claim 9, further comprising a ferrite bead, including a first terminal directly coupled to the third terminal of the secondary winding, and a second terminal directly coupled to the first terminal of the second rectifier.

11. A power conversion system, comprising:
  AC nodes;
  first and second DC nodes;
  a converter circuit configured to convert AC power to DC power or to convert DC power to AC power, the converter circuit including switching devices respectively configured to selectively couple one of the AC nodes with a respective one of the first and second DC nodes according to a respective switching control signal;
  a controller configured to generate the switching control signals;
  driver circuits coupled to provide driver signals to control terminals of the switching devices according to the switching control signal; and
  power supplies individually coupled to a respective one or group of the driver circuits, the individual power supplies including:
    a transformer having a primary winding coupled to an input voltage, and a secondary winding;
    a reference node coupled to a first terminal of the secondary winding;
    a power supply output node coupled to a supply input of an associated one of the driver circuits;
    a rectifier, including a first terminal coupled to a second terminal of the secondary winding, and a second terminal coupled to the power supply output node; and
    a clamp circuit, including a first terminal directly coupled to the first terminal of the rectifier, and a second terminal directly connected to the reference node to limit a secondary voltage across the secondary winding;
  wherein the clamp circuit includes:
    a transient voltage suppressor (TVS), including a first terminal directly coupled to the first terminal of the rectifier, and a second terminal directly coupled to a first internal node;
    a resistor, including a first terminal directly coupled to the first internal node, and a second terminal directly coupled to the reference node; and
    a capacitor, including a first terminal directly coupled to the first internal node, and a second terminal directly coupled to the reference node.

12. The power conversion system of claim 11, wherein the TVS is a bidirectional transient voltage suppression diode.

13. The power conversion system of claim 11, further comprising a ferrite bead, including a first terminal directly coupled to the second terminal of the secondary winding, and a second terminal directly coupled to the first terminal of the rectifier.

14. A power supply comprising:
  a transformer having a primary winding coupled to an input voltage, and a secondary winding;
  a reference node coupled to a first terminal of the secondary winding;
  a power supply output node for outputting power;
  a rectifier, including a first terminal coupled to a second terminal of the secondary winding, and a second terminal coupled to the power supply output node;
  a clamp circuit, including a first terminal directly coupled to the first terminal of the rectifier, and a second terminal directly connected to the reference node to limit a secondary voltage across the secondary winding, wherein the clamp circuit comprises:
    a transient voltage suppressor (TVS), including a first terminal directly coupled to the first terminal of the rectifier, and a second terminal directly coupled to a first internal node;

a resistor, including a first terminal directly coupled to the first internal node, and a second terminal directly coupled to the reference node; and a capacitor, including a first terminal directly coupled to the first internal node, and a second terminal directly coupled to the reference node;

a switch coupled between the primary winding and a reference voltage node; and a controller, including an output coupled to the switch and configured to operate the switch at a switching frequency;

wherein the clamp circuit is configured to suppress high frequency components of the secondary voltage above the switching frequency and does not suppress components of the secondary voltage at or below the switching frequency.

15. The power supply of claim 14, wherein:

the clamp circuit is configured to suppress high frequency components of the secondary voltage at 1 MHz or more and 100 MHz or less.

16. The power supply of claim 14, wherein the TVS is a bidirectional transient voltage suppression diode.

17. The power supply of claim 14, further comprising a ferrite bead, including a first terminal directly coupled to the second terminal of the secondary winding, and a second terminal directly coupled to the first terminal of the rectifier.

18. The power supply of claim 14, further comprising:

a second power supply output node;

a second rectifier, including a first terminal coupled to a third terminal of the secondary winding, and a second terminal coupled to the second power supply output node; and a second clamp circuit, including a first terminal directly coupled to the first terminal of the second rectifier, and a second terminal directly coupled to the reference node to limit a second secondary voltage across the secondary winding.

* * * * *